(12) United States Patent
Elliott (10) Patent No.: US 7,366,125 B1
(45) Date of Patent: Apr. 29, 2008

(54) EXTENSIBLE SATELLITE COMMUNICATION SYSTEM

(75) Inventor: Brig Barnum Elliott, Arlington, MA (US)

(73) Assignee: BBN Technologies Corp., Cambridge, MA (US)

( * ) Notice: Subject to any disclaimer, the term of this patent is extended or adjusted under 35 U.S.C. 154(b) by 862 days.

(21) Appl. No.: 10/625,991

(22) Filed: Jul. 24, 2003

(51) Int. Cl.
H04B 7/185 (2006.01)

(52) U.S. Cl. .............. 370/316; 455/427; 455/12.1; 455/98

(58) Field of Classification Search ........... 370/216; 455/12.1, 427, 98; 398/121; 701/13
See application file for complete search history.

(56) References Cited

U.S. PATENT DOCUMENTS

| | | | |
|---|---|---|---|
| 5,261,055 A | 11/1993 | Moran et al. ............... 395/275 |
| 5,365,520 A | 11/1994 | Wang et al. | |
| 5,442,771 A | 8/1995 | Filepp et al. ............... 395/650 |
| 5,479,637 A | 12/1995 | Lisimaque et al. ......... 395/430 |
| 5,506,781 A | 4/1996 | Cummiskey et al. | |
| 5,579,522 A | 11/1996 | Christeson et al. ......... 395/652 |
| 5,596,738 A | 1/1997 | Pope ........................... 395/430 |
| 5,598,534 A | 1/1997 | Haas ..................... 395/200.09 |
| 5,608,910 A | 3/1997 | Shimakura .................. 395/670 |
| 5,619,211 A | 4/1997 | Horkin et al. | |
| 5,623,604 A | 4/1997 | Russell et al. ............ 395/200.1 |
| 5,666,293 A | 9/1997 | Metz et al. ............... 395/200.5 |
| 5,752,039 A | 5/1998 | Tanimura .................... 395/712 |
| 5,778,440 A | 7/1998 | Yiu et al. .................... 711/154 |
| 5,790,974 A | 8/1998 | Tognazzini ................. 701/204 |
| 5,878,256 A | 3/1999 | Bealkowski et al. ........ 395/652 |
| 5,959,576 A | 9/1999 | Ring | |
| 5,960,445 A | 9/1999 | Tamori et al. ............... 707/203 |
| 5,999,797 A | 12/1999 | Zancho et al. | |
| 6,009,497 A | 12/1999 | Wells et al. ................. 711/103 |
| 6,038,636 A | 3/2000 | Brown, III et al. ......... 711/103 |
| 6,064,814 A | 5/2000 | Capriles et al. ............. 395/701 |
| 6,073,206 A | 6/2000 | Piwonka et al. ............ 711/102 |
| 6,073,214 A | 6/2000 | Fawcett ....................... 711/133 |
| 6,088,759 A | 7/2000 | Hasbun et al. .............. 711/103 |
| 6,105,063 A | 8/2000 | Hayes, Jr. .................... 709/223 |
| 6,112,024 A | 8/2000 | Almond et al. ............. 395/703 |

(Continued)

FOREIGN PATENT DOCUMENTS

CA 2339923 3/2000

(Continued)

OTHER PUBLICATIONS

G. Minden et al.: "Routing in Space Based Internets," Information and Telecommunication Technology Center, Department of Electrical Engineering and Computer Science, University of Kansas, 3 pages.

(Continued)

Primary Examiner—Duc M. Nguyen
Assistant Examiner—Wayne Cai
(74) Attorney, Agent, or Firm—Ropes & Gray LLP (57) ABSTRACT

A satellite network [100] includes backbone satellites [110]. The backbone satellites [110] act as routers for data units transmitted through network [100]. The backbone satellites [110] communicate with one another through inter-satellite links [111]. The satellite network [100] may further include user satellites [120] and ground stations [140]. The user satellites [120] may communicate with the backbone satellites [110] through omni-directional links [112].

20 Claims, 4 Drawing Sheets

U.S. PATENT DOCUMENTS

| | | | |
|---|---|---|---|
| 6,112,197 | A | 8/2000 | Chatterjee et al. ............. 707/3 |
| 6,126,327 | A | 10/2000 | Bi et al. ................ 395/200.51 |
| 6,128,695 | A | 10/2000 | Estakhri et al. ............ 711/103 |
| 6,144,336 | A | 11/2000 | Preston et al. |
| 6,157,559 | A | 12/2000 | Yoo ........................... 365/52 |
| 6,157,624 | A | 12/2000 | Zancho |
| 6,163,274 | A | 12/2000 | Lindgren .............. 340/825.44 |
| 6,198,946 | B1 | 3/2001 | Shin et al. .................. 455/561 |
| 6,279,153 | B1 | 8/2001 | Bi et al. ...................... 717/11 |
| 6,311,322 | B1 | 10/2001 | Ikeda et al. .................... 717/1 |
| 6,438,585 | B2 | 8/2002 | Mousseau et al. ......... 709/206 |
| 6,512,920 | B1 | 1/2003 | Yaoya |
| 6,597,311 | B2 | 7/2003 | Sheynblat et al. |
| 6,661,996 | B1 * | 12/2003 | Wiedeman et al. ........ 455/12.1 |
| 6,839,519 | B1 * | 1/2005 | Kleiner et al. ............. 398/121 |
| 6,847,867 | B1 * | 1/2005 | Elliott ........................ 701/13 |
| 7,068,971 | B2 | 6/2006 | Abutaleb et al. |
| 2001/0029178 | A1 | 10/2001 | Criss et al. ................. 455/419 |
| 2001/0047363 | A1 | 11/2001 | Peng ....................... 707/104.1 |
| 2001/0048728 | A1 | 12/2001 | Peng ......................... 375/354 |
| 2002/0078209 | A1 | 6/2002 | Peng ......................... 709/227 |
| 2002/0116261 | A1 | 8/2002 | Moskowitz et al. .......... 705/14 |
| 2002/0131404 | A1 | 9/2002 | Mehta et al. ............... 370/352 |
| 2002/0152005 | A1 | 10/2002 | Bagnordi .................... 700/234 |
| 2002/0156863 | A1 | 10/2002 | Peng ......................... 709/217 |
| 2002/0157090 | A1 | 10/2002 | Anton, Jr. ................... 717/178 |
| 2003/0033599 | A1 | 2/2003 | Rajaram et al. ............ 717/173 |
| 2003/0037075 | A1 | 2/2003 | Hannigan et al. ........... 707/500 |
| 2003/0061384 | A1 | 3/2003 | Nakatani .................... 709/245 |
| 2003/0137930 | A1 * | 7/2003 | Futernik ..................... 370/216 |
| 2003/0147142 | A1 * | 8/2003 | Biswas et al. .............. 359/618 |
| 2004/0093132 | A1 * | 5/2004 | Capots et al. ................. 701/13 |
| 2004/0192197 | A1 * | 9/2004 | Capots et al. ............. 455/12.1 |
| 2005/0213586 | A1 | 9/2005 | Cyganski et al. |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |

OTHER PUBLICATIONS

Ram Ramanathan: "Making Ad Hoc Networks Density Adaptive," Internetwork Research Department, BBN Technologies, Cambridge, Massachusetts, 5 pages.

Ram Ramanathan: "Topology Control of Multihop Wireless Networks using Transmit Power Adjustment," Internetwork Research Department, BBN Technologies, Cambridge, Massachusetts 10 pages.

Zhuochuan Huang et al.: "Topology Control for Ad hoc Networks with Directional Antennas," Department of Computer and Information Sciences, University of Delaware, Newark, Delaware, 7 pages.

Nachum Shacham: "Protocols For Multi-Satellite Networks," SRI International, Menlo Park, California pp. 0501-0505.

Steve A. Borbash et al.: "Distributed Topology Control Algorithm for Multihop Wireless Networks," 6 pages.

Ram Ramanathan: "On the Performance of Ad Hoc Networks with Beamforming Antennas," Internetwork Research Department, BBN Technologies, Cambridge, Massachusetts, 11 pages.

"Keplerian Elements Tutorial," http://www.amsat.org/amsat/keps/kepmodel.html, Feb. 14, 2003, pp. 1-5.

Demitri Bertsekas, Robert Gallagher, *Data Networks*, 2nd Edition, (1991), pp. 418-433.

"To Diode, DORIS, Doris mission on SPOT 4," http://spot4.cnes.fr/spot4_gb/doris-di.ht, Oct. 28, 2002, pp. 1-6.

"BLISL Project: The Second Year," http://www.technion.ac.il/ASRI/projects/blis1/2ndyear.htm, pp. 1-9.

"SPOT 4 and ARTEMIS," Nov. 20, 2001, http://www.ukspace.com/press/press105.htm, pp. 1-3.

"Optical Ground Station has sights set on Artemis," European Space Agency, http://www.esa.int/export/esaSA/ESAJI7UM5JC_telecom_2.html, pp. 1-3.

NASDA Report: "Toward Inter-orbit Communications Experiments Using Optical Communications Technology," No. 85, Jul. 1999, http://www.nasda.go.jp/lib/nasda-news/1999/07/opt_e.html, pp. 1-2.

Optical Space Communications Group, http://www2.crl.go.jp/mt/bl62/index-e.html, 3 pages.

Thomas Ross Henderson: "Networking over Next-Generation Satellite Systems," University of California at Berkeley, Fall 1999, 157 pages.

Rodger Magness. "Comparison of CAN and Bluetooth Protocols." Data Systems in Aerospace; Prague, Czech Republic; 91 pgs. (2003).

Bevan et al. "Free-Space Optical Data Bus for Spacecraft." Earth Science Technology Conference. 6 pgs. (Jun. 24-26, 2003).

David Everett. "GPM Reference Interfaces." 9 pgs. (May 30, 2001).

"Power Line Carrier Techniques Applied to Spacecraft Data Handling." Data Systems in Aerospace DASIA; Prague, Cech Republic. 16 pgs. (Jun. 2-6, 2003).

SEA (Group) Ltd., "TerraSAR Equipment Development." 1 pg. (2003).

Mike Waligore. "Test & Training Technology Workshop." App. Research Lab. 25 pgs. (2002).

Pascall et al. "Commercial Satellite Communication." pp. 78-91 (1997).

* cited by examiner

EXTENSIBLE SATELLITE COMMUNICATION SYSTEM

RELATED APPLICATIONS

This application is related to the following commonly assigned applications filed on even date herewith: "Satellite Location Dissemination," application Ser. No. 10/626,112; and "Satellite System Topology Control," application Ser. No. 10/626,306. The contents of these two applications are hereby incorporated herein by reference.

BACKGROUND OF THE INVENTION

A. Field of the Invention

The present invention relates generally to satellite systems, and more particularly, to self-organizing and extensible satellite networks.

B. Description of Related Art

Communication satellites represent one of the most significant applications of space technology. Communication satellites can allow radio, television, and telephone transmissions to be sent live anywhere in the world. Before satellites, transmissions were difficult or impossible at long distances. The signals, which travel in straight lines, could not bend around the Earth to reach a destination far away. Because satellites are in orbit, the signals can be sent instantaneously into space and then redirected to their destination.

Communications satellites are often in geostationary orbit. At the orbital altitude of 35,800 kilometers, a geostationary satellite orbits the Earth in the same amount of time it takes the Earth to revolve once. From Earth, therefore, the satellite appears to be stationary. Communication satellites can also be in highly elliptical orbits. This type of orbit is roughly egg-shaped, with the Earth near the top of the egg. In a highly elliptical orbit, the satellite's velocity changes depending on where it is in its orbital path. When the satellite is in the part of its orbit that is close to the Earth, it moves faster because the Earth's gravitational pull is stronger.

Conventionally, systems of multiple satellites have been designed as predetermined constellations of satellites. In these systems, the final position and function of each of the satellites is determined as the system is being designed and conceived. Examples of such satellite systems include the Iridium and Teledesic systems.

It would be desirable to improve design and implementation flexibility for multiple satellite systems.

SUMMARY OF THE INVENTION

An extensible satellite system includes backbone satellites, user satellites, and ground links. The backbone and user satellites and ground stations, may be added as needed to the system.

One aspect of the invention is directed to a satellite network. The satellite network includes backbone satellites that act as routers for data units transmitted through the network. The backbone satellites communicate with one another through inter-satellite links. The network additionally includes user satellites and ground stations. The user satellites connect with the network via the backbone satellites through access links. The ground stations connect to the backbone satellites through up/down links. The inter-satellite links and the up/down links include directional transmissions and the access links include omni-directional transmissions.

A second aspect consistent with the invention is directed to a method of adding a satellite into a satellite network. The method includes determining, at the satellite, an orbital location of the satellite. The method further includes selecting a ground station with which to communicate based on the determined orbital location and receiving, from the selected ground station, at least one of location and orbital information of other satellites in the satellite network. Still further, the method includes transmitting the location of the satellite to the selected ground station.

A third aspect consistent with the invention is directed to a satellite including a router, a first input/output device that communicates with other devices using omni-directional radio frequency links, and a second input/output device that communicates with other satellites using directional communication links. The directional communication links are higher capacity links than the omni-directional radio frequency links.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

As described herein, a satellite system includes a number of satellites that can dynamically form and break connectivity with one another as the satellites move in and out of communication range, i.e., by following their various orbital trajectories. The system may include backbone satellites that act as network routers and communicate with one another and with ground terminals via high-capacity directional links. User devices may connect to the backbone satellites via omni-directional links.

Exemplary System Overview

Figure 1:
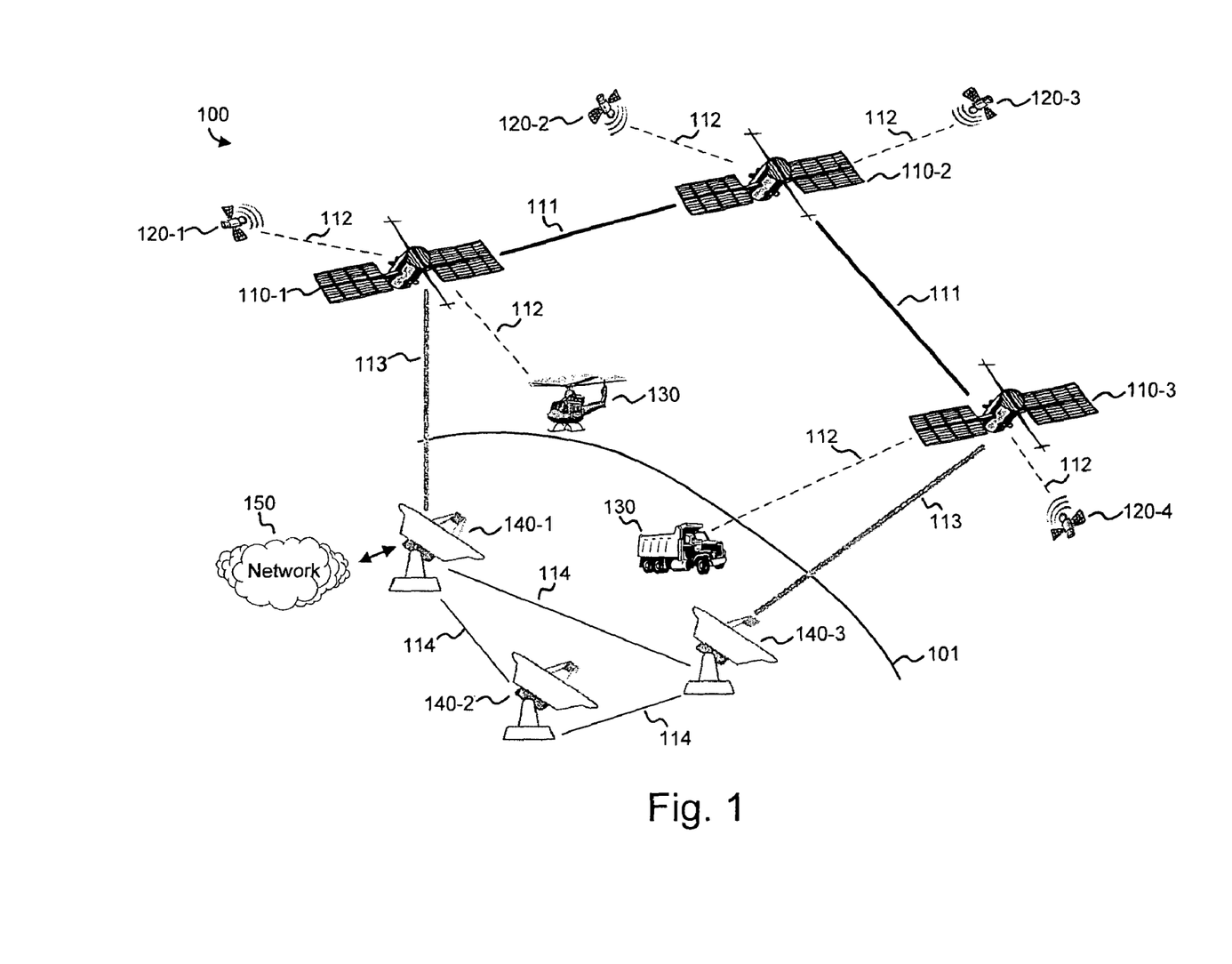
FIG. 1 is a diagram conceptually illustrating a satellite network implemented based on concepts consistent with aspects of the invention.

FIG. 1 is a diagram conceptually illustrating a satellite network 100 implemented based on concepts consistent with aspects of the invention. In FIG. 1, curved line 101 represents the edge of the Earth. Network 100 includes a number of elements that correspond to either Earth based or space based network devices.

As shown in FIG. 1, the space based network devices may include a number of "backbone" satellites 110-1, 110-2, and 110-3 (collectively backbone satellites 110), and a number of "user" satellites 120-1 through 120-4 (collectively user satellites 120) that communicate through backbone satellites 110 to obtain network service. Although three backbone satellites 110 and four user satellites 120 are shown in FIG. 1, one of ordinary skill in the art will recognize that these numbers are for illustrative purposes only.

Backbone satellites 110 communicate with each other over inter-satellite links, labeled as links 111 in FIG. 1. These links may be implemented as optical (e.g., laser) communication links or as conventional RF links (e.g., microwave). In either case, backbone satellites 110 may use directional transmitters and receivers to communicate with one another. Directional transmitters and receivers allow backbone satellites 110 to communicate over longer distances than with omni-directional communication schemes. Directional communication schemes, however, require that each backbone satellite 110 know its location relative to another backbone satellite with which it would like to communicate so that it can point its transmitter/receiver in the correct direction.

Inter-satellite links 111 may be high capacity links. For example, when implemented using radio frequency (RF) technology, they may run at 100s of megabits/second. When implemented with optical transmitters and receivers, they may run at 10s of gigabits/second.

User satellites 120 may communicate with backbone satellites 110 through access links 112 (shown in FIG. 1 as dotted lines). Access links 112 may be RF links that tend to be of lower capacity and have shorter ranges than inter-satellite links 111. Access links 112 may also be designed to only require omni-directional antennas on user satellites 120. Omni-directional antennas do not require the sophisticated pointing and tracking mechanisms that are required of directional antennas. Backbone satellites 110, in forming access links 112, may use, for example, omni-directional, patch, sectorized, or dish antennas. The particular antenna to use may depend on the specific services that are required. The RF communications forming access links 112 may be in a number of frequency bands, such as UHF band, L band, cellular (or GSM or PCS) bands, ISM bands (910 MHz or 2.4 GHz), or other convenient frequency bands.

Network 100, in addition to including backbone satellites 110 and user satellites 120, may also include earth based entities. As shown in FIG. 1, earth based entities 130 (illustratively shown as a helicopter and a truck) may interface with network 100 through access links 112 in a manner similar to user satellites 120.

Backbone satellites 110 may connect to one or more ground stations 140-1 through 140-3 (collectively ground stations 140) via up/down links 113. Up/down links 113 may include high capacity links designed for communication between a satellite and a ground terminal. Ground stations 140 may include fairly large and established ground terminals that have high capacity links designed for communications with satellites. Ground stations 140 may include, for example, large dish antennas that communicate through an RF connection with backbone satellites 110. The RF connection may run at, for example, 1 gigabit/second.

Ground stations 140 may connect to one another through standard terrestrial links, such as fiber optic links 114. One of ordinary skill in the art will appreciate that other types of terrestrial links, such as, for instance, coaxial cable, ATM, and freespace optical connections are also possible.

Ground stations 140 may also act as network gateways to other private or public networks, such as network 150. In the case of a public network, network 150 may be the Internet. In the case of a private network, network 150 may be, for example, a proprietary military or corporate network. In some cases, network 150 may include a private portion and a public portion. In general, networks 100 and 150 allow any entity that can connect to network 150 the ability to communicate through the satellite portion of the network.

Network 100 may transmit data using a packet based transmission protocol, such as the well known Internet Protocol (IP). Under the IP protocol, each device in network 100 is associated with an IP address that uniquely identifies it from all other devices. Data sent under the IP protocol is broken into data units called packets, each of which include the IP address that identifies the destination for the packet. A packet "hops" from one device to another in network 100 until it is received by its destination device.

Satellite Architecture

Figure 2:
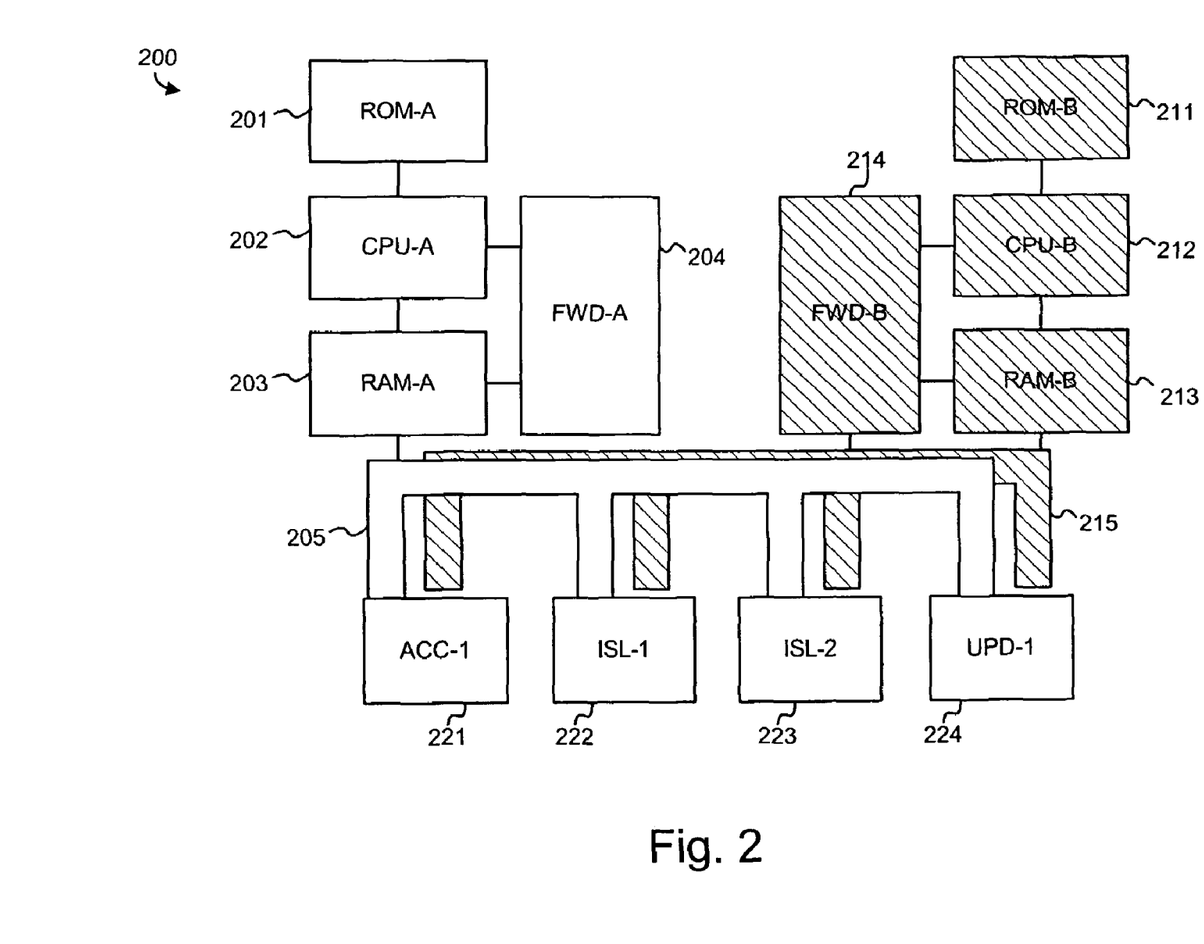
FIG. 2 is an exemplary hardware diagram illustrating one of the backbone satellites shown in FIG. 1.

FIG. 2 is an exemplary hardware diagram of one of backbone satellites 110, labeled as backbone satellite 200 in FIG. 2. Backbone satellite 200, as well as being a communication satellite, may act as a router in network 100.

Backbone satellite 200 may include a redundant implementation to facilitate fault tolerance. In FIG. 2, this is shown as an "A" side architecture and a "B" side architecture.

The A side architecture may include read-only-memory (ROM) 201, a processor (CPU) 202, random access memory (RAM) 203, and forwarding engine (FWD) 204. A cross-bar bus (X-BAR) 205 may connect RAM 203 and forwarding engine 204 to input/output components 221-224.

The B side architecture may be implemented in an essentially identical manner to the A side architecture and acts as a backup in case of a failure in the A side architecture. In particular, the B side architecture may include ROM 211, a CPU 212, RAM 213, and forwarding engine 214.

ROM 201 and 211 may each contain all necessary read-only storage for backbone satellite 200. ROM 201 and 211 may, for example, store programming instructions for operation of the backbone satellite, geo-locations of some or all ground stations, system identifiers, configuration parameters, etc. Although shown as single monolithic ROM devices, ROM 201 and 211 may be implemented as a mix of different types of non-volatile memory, and may even include a certain amount of reprogrammable memory as well. For instance, ROM 201 or 211 may be implemented as ROM, EEPROM, flash, etc.

CPUs 202 and 212 may be embedded processors that execute computer instructions. CPUs 202 and 212 may generally manage the control and routing functions for backbone satellite 200.

Forwarding engines 204 and 214 may each include high-speed data forwarding paths that obtain header information from packets received by backbone satellite 200, and based on the header information, may retransmit that packets on a link that leads towards the final destination of the packet. Forwarding engines 204 and 214 may include one or more forwarding tables that store information relating to packet forwarding. The forwarding tables may alternatively be stored in RAM 203 and 213. To increase processing speed, forwarding engines 204 and 214 may be implemented as FPGAs (field programmable gate arrays), ASICs (application specific integrated circuits), or other high-speed circuitry. In general, forwarding engines 204 and 214 implement many of the core routing functions of backbone satellite 200, and thus, in conjunction with their CPUs and RAMs, function as a router in the satellite. The design and implementation of routers and routing techniques is generally known in the art and will thus not be described further herein.

RAM 203 and 213 includes volatile memory in which data packets and/or other data structures may be stored and manipulated. I/O devices 221-224 may access RAM 203 and 213. RAM 203 and 213 may store queues of packets that can be read and transmitted by I/O devices 221-224.

I/O devices 221-224 contain the hardware interfaces, transceivers, and antennas (or telescopes) that implement links 111-113. ACC I/O device 211 handles access links 112. ISL I/O devices 222 and 223 handles inter-satellite links 111. UPD I/O device 224 handles up/down links 113.

Although backbone satellite 200 is shown as having four I/O devices 221-224, one of ordinary skill in the art will recognize that backbone satellite 200 could have fewer or more I/O devices. Further, multiple I/O devices, such as ISL I/O devices 222 and 223 may be operated in unison to form a single high capacity link.

Self-Organizing Communications Between Satellites and Ground Stations

As previously mentioned, network 100 may be extensible. That is, satellites can dynamically join the network in an ad-hoc manner. Typically, a satellite may join network 100 soon after it is launched. Because network 100 is not tailored to any particular orbit or set of orbits, satellites can be added to network 100 as needed in any orbital planes or altitudes that may be convenient, without the need for any prior planning.

Figure 3:
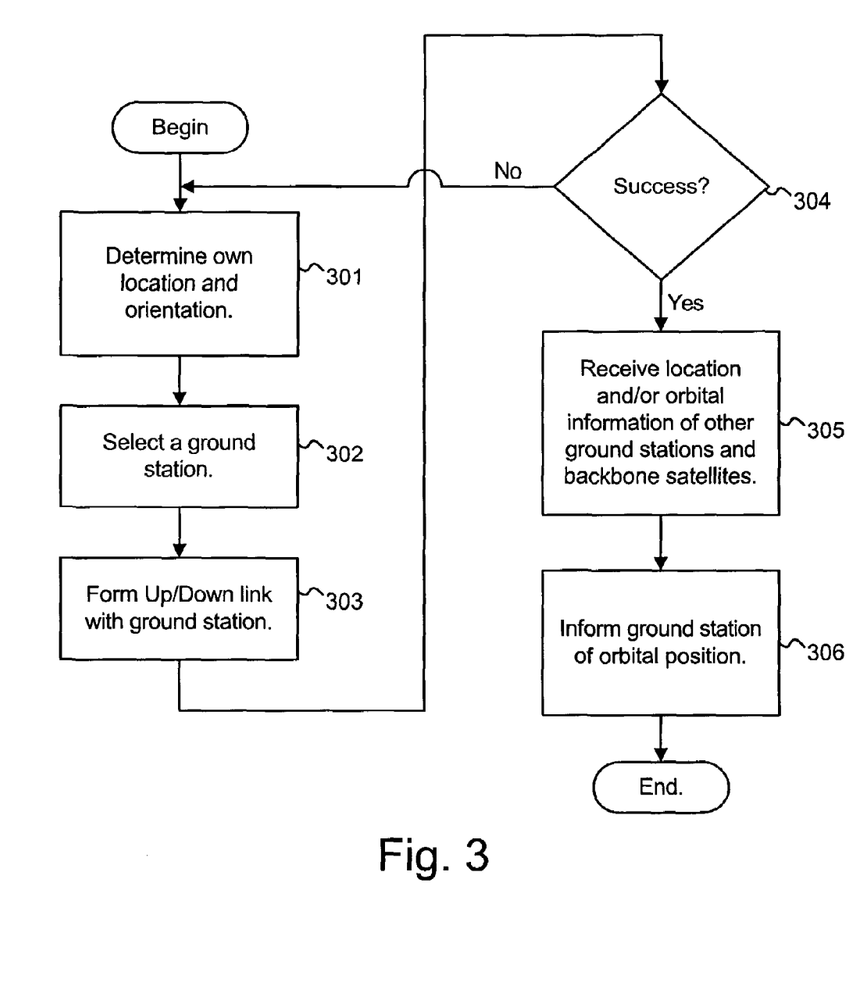
FIG. 3 is a flow chart illustrating the integration of a satellite in the satellite network.

FIG. 3 is a flow chart illustrating the integration of a satellite, such as one of backbone satellites 110, into network 100. Processing may begin with backbone satellite 110 determining its own location and orientation (Act 301). Techniques through which a satellite may determine its three-dimensional location and orientation are known in the art. One such technique is the DORIS (Doppler Orbitography and Radiopositioning Integrated by Satellite) project, which was designed and developed by CNES, the Groupe de Recherches de Géodésie Spatiale, GRGS (CNES/CNRS/Université Paul Sabatier) and the Institut Géographique National (IGN). In general, under DORIS, each host satellite carries a DORIS receiver, ultrastable oscillator, and an omnidirectional antenna. The receiver takes Doppler shift measurements of 400 MHz and 2 GHz radio signals transmitted by a number of permanent "orbitography" beacons. This measured data, as well as a knowledge of the permanent location of the beacons, allows the host satellite to determine its location and trajectory.

Backbone satellite 110 may then select a nearby ground station (Act 302). The location of some or all of the ground stations may be stored in ROM 201 and 211. Accordingly, with this information and the satellite's own location information determined in Act 301, backbone satellite 110 can calculate the location of a ground station relative to the satellite and select the closest ground station.

Backbone satellite 110 may then point UPD I/O device 224 at the selected ground station to form an up/down link 113 (Act 303). Backbone satellite 110 may thus create an up/down link that connects the satellite to network 100. In the event of a failure in Acts 301-303, backbone satellite 110 may retry these Acts (Act 304).

After backbone satellite 110 has successfully connected to a ground station, backbone satellite 110 may exchange a more complete set of network information with the ground station. In particular, the ground station may transmit the location or satellite orbital information of all other ground stations and backbone satellites in network 100 (Act 305). Additionally, backbone satellite 110 informs the ground station of its own orbital information (Act 306). The ground station may disseminate the satellite's orbital information to the other ground stations and backbone satellites in network 100.

Once one of backbone satellites 110 has learned of the other backbone satellites and ground stations in network 100, it may form inter-satellite links 111 and process communications from user satellites 120 and earth based entities 130. In some orbits, inter-satellite links 111 may be very steady. For example, satellites launched into geostationary orbit do not move very much relative to one another. Thus, once an inter-satellite link has been formed it can be used for an extended period of time.

However, in the case of backbone satellites that are not both in geostationary orbit, links may come and go relatively quickly. For example, if two backbone satellites are in different planes of low-earth orbit, they may only be able to connect for minutes at a time before they sink below the earth's horizon and thus out of direct communication range.

In the latter situation, in which the backbone satellites need to relatively frequently reform links, network topology control for these links can either be centralized or distributed. In either case, the topology control system coordinates the pairing of backbone satellites that point their directional transmitters and receivers at one another.

In a centralized topology control system, a centralized entity is responsible for determining which satellites should form links to which other satellites. This entity may, for example, be located at one of ground stations 140. In this control system, all of backbone satellites 110 communicate their orbital information to this central entity, which in turn runs an algorithm that determines which links should be formed. The central entity then transmits commands to backbone satellites 110 giving them the schedule of where and when they should steer their directional transceivers, such as ISL I/O devices 222 and 223, and UPD I/O device 224. Additional details describing a centralized topology control system can be found in U.S. patent application Ser. No. 10/626,306, entitled "Satellite System Topology Control," the contents of which were previously incorporated by reference.

In a distributed topology control system, each backbone satellite 110 is responsible for determining its own schedule for steering its directional transceivers and thus for making or breaking inter-satellite links 111.

Operation of Network 100

Figure 4:
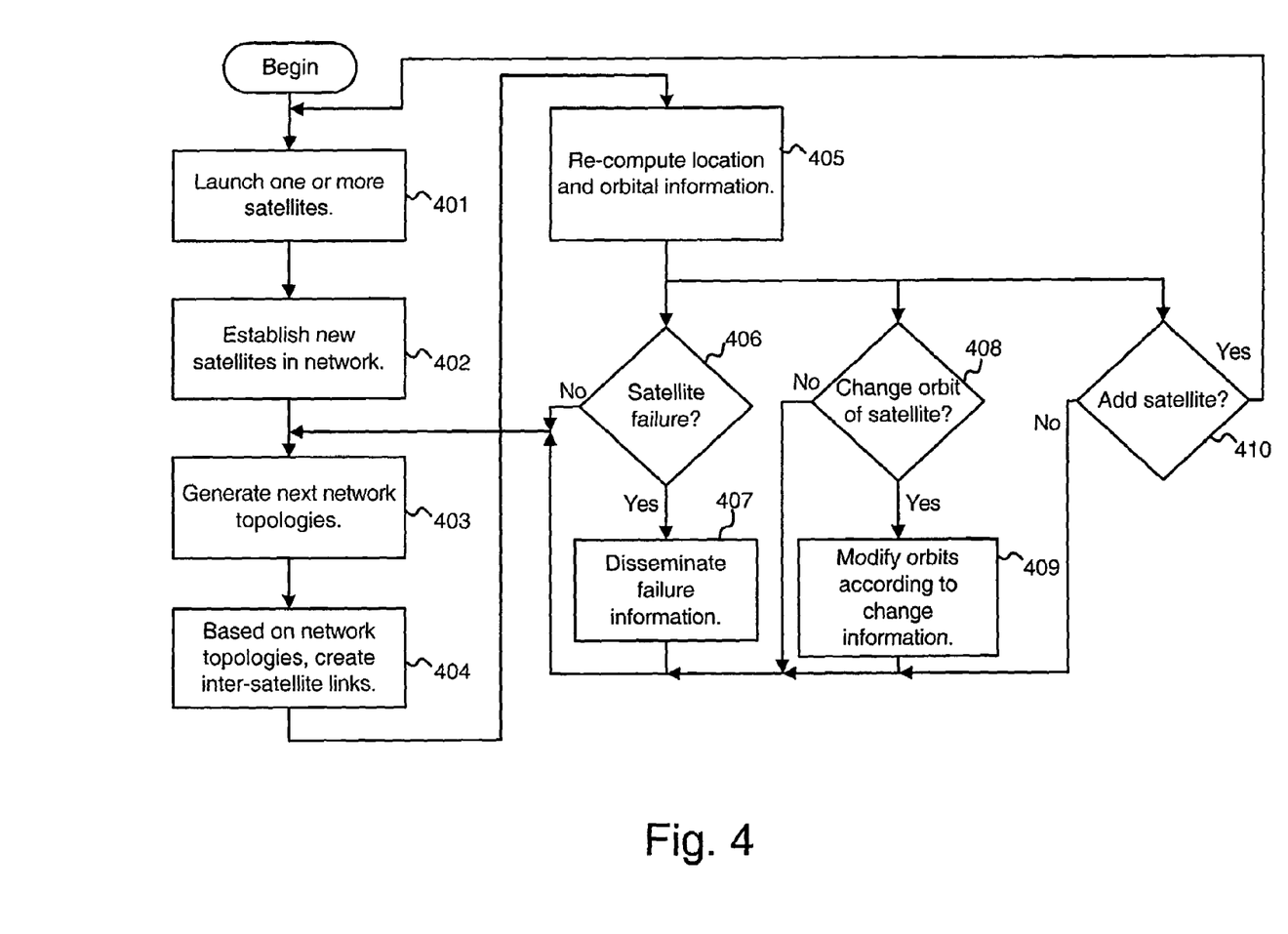
FIG. 4 is a flow chart illustrating methods consistent with aspects of the invention for operation of the network shown in FIG. 1.

FIG. 4 is a flow chart illustrating methods consistent with aspects of the invention for overall operation of network 100. One or more backbone satellites 110 and possibly one or more user satellites 120 are launched (Act 401). Each new backbone satellite 110 may then establish itself in network 100, as described above with reference to FIG. 3 (Act 402). Network 100, in either a centralized or distributed fashion (discussed above), calculates the next desired network topology, or series of desired topologies (Act 403).

At a given start time for a given inter-satellite link 111, two backbone satellites 110 involved in the link steer their respective transmit/receive equipment (i.e., ISL access devices 222 and 223) to point towards one another (Act 404). On an ongoing basis, backbone satellites 110 recompute their location and orbital information and disseminate this information to other satellites in network 100 (Act 405). Additional details describing dissemination of orbital information in network 100 can be found in U.S. patent application Ser. No. 10/626,112, entitled "Satellite Location Dissemination." Acts 403-405 can be repeated as necessary during normal operation of the network.

If a satellite, or a portion of a satellite fails, this information is disseminated through network 100 (Acts 406 and 407). Also, from time to time, centralized control may be exerted to change the orbit of a backbone satellite 110. This may be done, for example, to rearrange coverage or avoid "bad" orbits (e.g., those with radiation or debris). Such centralized control may be exerted by one of ground stations 140. More particularly, the ground station sends messages to the affected backbone satellites 110 (Act 408). These backbone satellites 110 maneuver according to these commands, continuously updating their location and orbital information with network 100 until the network topology is accordingly changed (Act 409).

Additional satellites can be added to network 100 (Act 410) and processing may return to Act 401.

Network 100, as described above, implements an extensible network of satellite and terrestrial network devices. In general, any device connected to a portion of network 100 can communicate with another device connected to network 100 by forwarding data, such as packets, hop-by-hop through network 100. For instance, user satellite 120-2 may communicate with a device on public network 150 by transmitting a packet to backbone satellite 110-2. From backbone satellite 110-2, the packet may travel to backbone satellite 110-1, to ground station 140-1, and then to network 150. Each of these "hops" from satellite to satellite, from satellite to ground station, and then from a ground station to network 150 may be directed by the routing components (e.g., components 201-204) present in the backbone satellites (and also at ground station 140).

Because the satellites in network 100 are automatically self-organizing, they form the multi-hop network automatically. Whenever it is possible for a satellite to be connected to network 100, and to begin acting as part of the communication fabric, it will be. Thus, all commands, telemetry, and status information (sometimes called Telemetry, Tracking, Command, and Communication—TTC&C) for a given satellite may be sent through the network rather than some dedicated, out-of-band radio link.

As discussed above, network 100 is not tailored to any particular orbit or set of orbits. Some satellites can be launched into low earth orbit (LEO), while others may be in medium earth orbit (MEO), while still others may be in geostationary earth orbit (GEO), highly inclined orbits, eccentric orbits, or Moliya orbits. The satellites will automatically find each other, determine the best inter-satellite link to form at any given moment, and create a mesh-connected network that includes all of the satellites in the various orbits. This allows for significant flexibility in setting up and modifying the network. If a portion of the network is underserved, additional satellites can be launched to "thicken up" that portion of the network.

CONCLUSION

A satellite network includes backbone satellites and user satellites. Backbone satellites route traffic over the network and communicate with one another using high-capacity inter-satellite links. The satellite network is self-organizing and extensible and may contain satellites that have different types of orbits.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code or hardware logic. It should be understood that a person of ordinary skill in the art would be able to design software and control hardware to implement the aspects of the present invention based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, although the term "satellite" was primarily described herein to refer to a device orbiting the Earth, such devices could also orbit other celestial bodies, such as the Moon or Mars.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed:

1. A satellite network comprising:
   backbone satellites configured to act as routers for data units transmitted through the network, the backbone satellites communicating with one another through inter-satellite links;
   user satellites configured to connect with the network via the backbone satellites through access links; and
   ground stations configured to connect to the backbone satellites through up/down links, wherein the inter-satellite links and the up/down links include directional transmissions and the access links include omni-directional transmissions from the user satellites.

2. The satellite network of claim 1, wherein at least two of the ground stations are coupled through terrestrial links.

3. The satellite network of claim 1, wherein the backbone satellites, user satellites, and ground stations communicate with one another using the Internet Protocol (IP).

4. The satellite network of claim 1, wherein the backbone satellites each further comprise:
   a plurality of input/output devices that form the inter-satellite links, up/down links, and access links.

5. The satellite network of claim 1, wherein the backbone satellites dynamically form and break connections with one another based on relative locations of the backbone satellites to one another.

6. The satellite network of claim 1, wherein orbits of the backbone satellites include at least one of the backbone satellites in multiple ones of geostationary orbits, medium earth orbits, low earth orbits, highly inclined orbits, eccentric orbits, or Moliya orbits.

7. The satellite network of claim 1, wherein each of the backbone satellites further comprises:
   a forwarding engine;
   a processor coupled to the forwarding engine; and
   a random access memory coupled to the processor and the forwarding engine.

8. The satellite network of claim 7, wherein each of the backbone satellites further includes:
   a plurality of input/output devices that form the inter-satellite links, up/down links, and access links.

9. The satellite network of claim 7, wherein at least one of the backbone satellites further comprises redundant implementations of the forwarding engine, the processor, and the random access memory.

10. A method of adding a satellite into a satellite network, the method comprising:
   measuring position data of the satellite;
   determining, at the satellite, an orbital location of the satellite based on the measured position data;
   selecting a ground station with which to communicate based on the determined orbital location;
   receiving, from the selected ground station, at least one of location and orbital information of other satellites in the satellite network; and
   transmitting, by the satellite, the location of the satellite to the selected ground station to add the satellite to the satellite network.

11. The method of claim 10, wherein selecting the ground station is based on a prestored list of ground stations and locations corresponding to the ground stations.

12. The method of claim 10, further comprising:
   creating inter-satellites links with other satellites in the satellite network.

13. The method of claim 12, further comprising:
   dynamically modifying the inter-satellite links based on changing orbital information of the satellite and the other satellites.

14. The method of claim 12, wherein the inter-satellite links are formed with directional receivers and transmitters.

15. The method of claim 12, wherein the inter-satellite links are formed between satellites in different orbits.

16. The method of claim 15, wherein the different orbits include at least two of geostationary orbits, medium earth orbits, low earth orbits, highly inclined orbits, eccentric orbits, or Moliya orbits.

17. The method of claim 12, wherein the satellite and the other satellites communicate over the inter-satellite links based on the Internet Protocol (IP).

18. The method of claim 10, wherein the position data includes Doppler shift information measured by the satellite.

19. A method of operating a satellite network including backbone satellites and user satellites, the method comprising:
   receiving position information from the backbone satellites, the position information including location information of the backbone satellites;
   calculating network topology information based on the position information; and
   creating inter-satellite links, via directional transmitters/receivers, between the backbone satellites based on the network topology information;
   communicating packet data through the satellite network over the inter-satellite links; and
   creating access links, via omni-directional transmitters/receivers, between the backbone satellites and the user satellites.

20. The method of claim 19, further comprising:
   creating up/down links between the backbone satellites and ground stations.

* * * * *